Patented Sept. 11, 1934

1,973,394

UNITED STATES PATENT OFFICE

1,973,394
METHOD OF IMPREGNATING WOOD

Carl Schmittutz, Bad-Kissingen, Germany

No Drawing. Application July 26, 1933, Serial No. 682,266. In Germany July 25, 1932

4 Claims. (Cl. 47—58)

For the preservation and colouring of wood it has been proposed to force an impregnating liquid into the tree stem before the tree is felled. This method requires the stem to be bored or partly cross cut in order to get the liquid fairly distributed throughout the cross-sectional area of the stem.

The object of the present invention is to obtain an effective impregnation of the wood without boring or cutting the stem and without mechanical pressure, and the invention consists in removing the bark from a portion of a growing tree, and coating the smooth bared portion of the stem with a water soluble impregnating substance in pasty form.

Applied in this manner, the impregnating substance will penetrate the cells of the entire tree, partly by osmotic action and partly by being diffused into the circulating sap. The trees will finally die and can then be felled whenever required.

Successive experiments show that the method may be advantageously carried out as follows: About one meter from the ground a portion of the tree stem, about ½ meter long, is freed from bark including preferably the bast as well as the rind. The smooth bared portion of the stem is coated with a water soluble, pasty impregnating substance, composed of zinc-silico-fluoride, potassium fluoride or other mycocide salt of known composition including if desired a colouring matter. The thickness of the coating, which may be brushed or smeared on to the stem, may be from 1 to 7 mm. according to the size of the tree, enough paste being used to ensure sufficient impregnation of the wood. In order to speed up the impregnating process, the bark may be removed from several, spaced portions of the tree stem and coated as previously described.

In order to prevent the impregnating substance from being washed away by rain, and also to prevent the poisonous salt from being absorbed by animals, the pasty coating is preferably covered with a waterproof bandage.

Infusorial earth, glue, or glycerine may be added to the paste in order to render it more tenacious.

The trees, after being felled, can be left in situ for any length of time, and the stems can also be subjected to long storage without the risk of decomposition.

It should be observed that in a previous application Serial No. 586,378, dated January 13, 1932 I have described a method of impregnating wood by applying to it, after the tree has been felled and cleared of bark, a coating of pasty, water soluble impregnating substance, the coating being covered with a bandage.

I claim:

1. A method of impregnating wood consisting in removing the bark from a portion of a growing tree, and coating the smooth bared portion of the stem with a water soluble impregnating substance in pasty form.

2. A method of impregnating wood consisting in removing the bark from a portion of a growing tree, coating the smooth bared portion of the stem with a water soluble impregnating substance in pasty form, and covering the coating with a waterproof bandage.

3. A method of impregnating wood consisting in removing the bark from the lower portion of the stem of a growing tree, coating the smooth bared portion of the stem with a water soluble impregnating substance in pasty form, and covering the coating with a waterproof bandage.

4. A method of impregnating wood consisting in removing the bark from spaced portions of the stem of a growing tree, coating each smooth bared portion of the stem with a water soluble impregnating substance in pasty form, and covering each coated portion with a waterproof bandage.

CARL SCHMITTUTZ.